J. H. WHITNEY.
Feeding Mechanism for Sewing Machines.
No. 98,452. Patented Dec. 28, 1869.
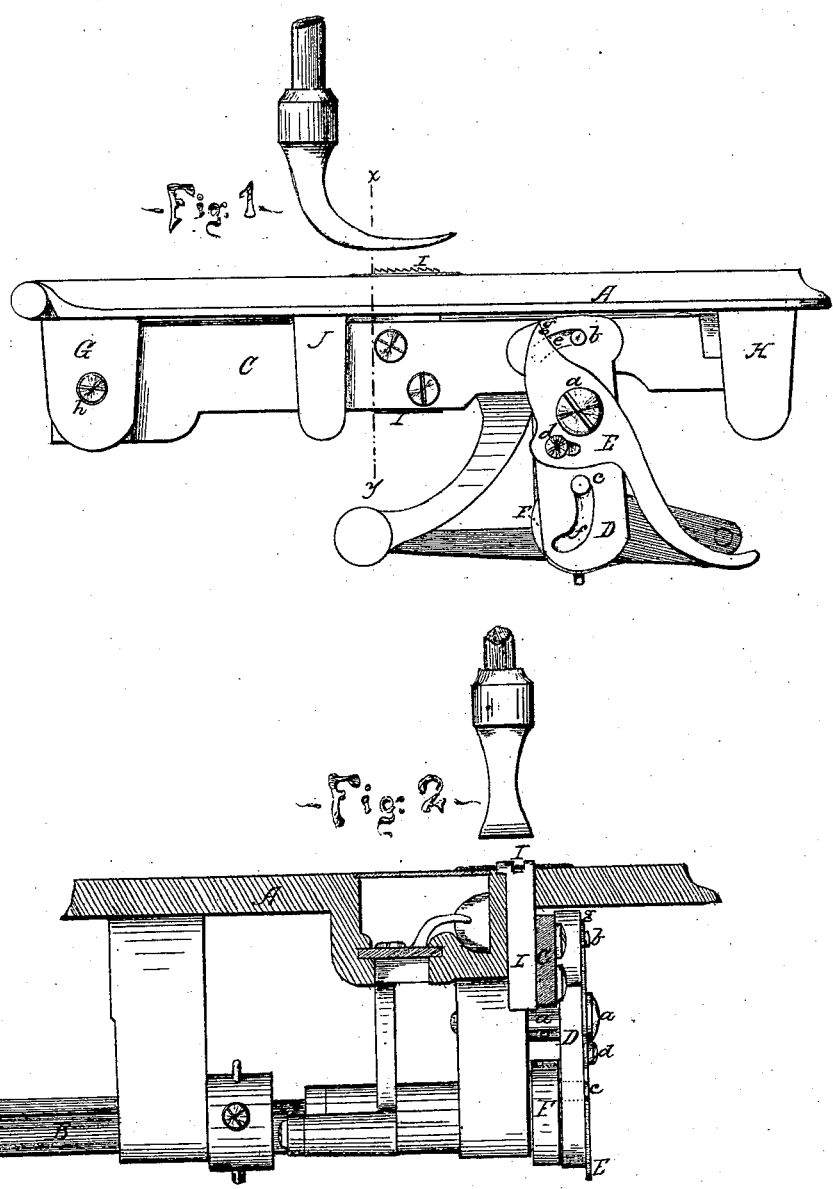

UNITED STATES PATENT OFFICE.

JAMES H. WHITNEY, OF BROOKLYN, NEW YORK.

IMPROVEMENT IN FEEDING MECHANISMS FOR SEWING-MACHINES.

Specification forming part of Letters Patent No. 98,452, dated December 28, 1869.

*To all whom it may concern:*

Be it known that I, JAMES H. WHITNEY, of Brooklyn, in the county of Kings and State of New York, have invented certain Improvements in Feeding Mechanism for Sewing-Machines, of which the following is a specification.

My invention relates to the feeding mechanism of sewing-machines; and it consists in a novel combination and arrangement of parts, whereby positive movements in all directions are given to a four-motion feed-bar for feeding material in sewing-machines.

In the accompanying drawings, Figure 1 is a side elevation of my invention attached to a sewing-machine. Fig. 2 is a vertical transverse section of the same, taken through the line $x\,y$.

A is the bed of a sewing-machine, to which are cast lugs G H J, extending downward, which are slotted to receive a bar, C, to which is secured, in any proper manner, a bar, I, the upper surface of which is notched or roughened, and which projects through a slot in the bed of the machine and acts upon the under side of the material to be fed. This bar C is slotted in the direction of its length, and slides upon a fulcrum-pin, $h$, in the lug G. At the back of the machine, and near the front end of the bar, is inserted a stud or pin, $b$.

To the hanger of the machine, which supports the driving-shaft, I pivot a short lever, D, at $a$, which has a cam-groove of the form shown in Fig. 1.

On the outer end of the shaft B of the machine I secure a collar, F, which has a crank-pin, $c$, of proper size to work in the slot $f$ in the lower end of the lever D, as plainly shown in Fig. 1. As the shaft B and collar F revolve a rocking motion is given to the lever D by the crank-pin $c$, working in the cam-slot $f$ in the lower end of the lever, and as the lever rocks the curve $e$ in the upper end of the lever will raise the pin $b$ and the bar to which it is secured sufficiently to engage with the material being sewed, which is held upon the feeding-surface I by a spring presser-foot, as in ordinary sewing-machines, and the bar is forced forward by an additional movement of the lever, resulting from the peculiar shape of the cam-groove $f$ in this lever D, to make the stitch.

To regulate the length of stitch I employ a dog, E, pivoted at $a$ outside the lever D, and slotted in the arc of a circle to receive a clamp-screw, $d$, which screws into the lever D to hold the dog in place when in the desired position. The upper end of this dog E has a horn, $g$, against which the stud-pin $b$ works and governs the extent of motion of the bar C. The shorter the slot $e$ is made by the horn $g$ of the dog E the longer the stitch will be, and vice versa.

By my improved mechanism I am enabled to insure a positive movement in all directions of the feed-bar and dispense entirely with the use of springs, render the feed perfectly noiseless and insure perfect uniformity in the length of stitches under all degrees of speed that the machine may be worked.

The operative parts of a sewing-machine, aside from the feed, will be readily understood by those skilled in the art, and a detailed description thereof is considered unnecessary.

I claim as my invention—

1. The arrangement and combination of the lever D, with its cam-grooves $e$ and $f$, the studs $b$ and $c$, and feed-bar C, with its surface I, the whole constructed and operating substantially as described and specified.

2. The combination, with the lever D, constructed as described, of the dog E for regulating the feed of the machine, substantially as described and specified.

JAMES H. WHITNEY.

Witnesses:
C. A. DURGIN,
EDWARD E. OSBORN.